A. J. EDGAR.
TRACTOR GUIDE.
APPLICATION FILED OCT. 14, 1920.
1,376,412.
Patented May 3, 1921.
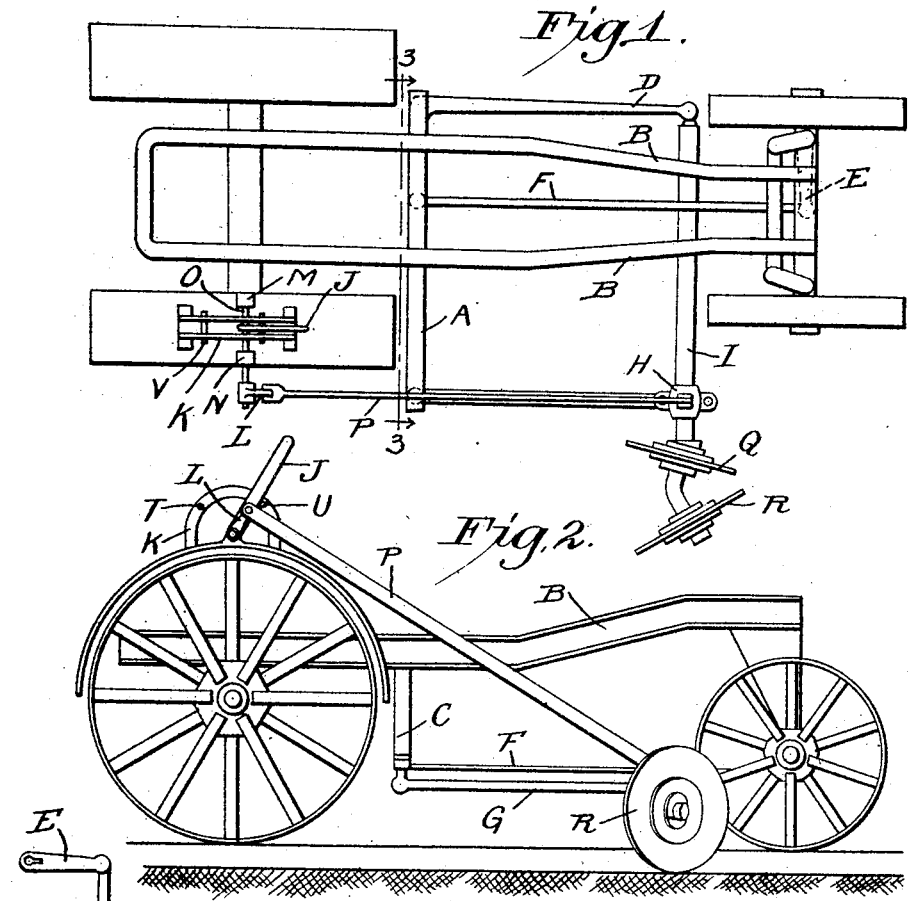
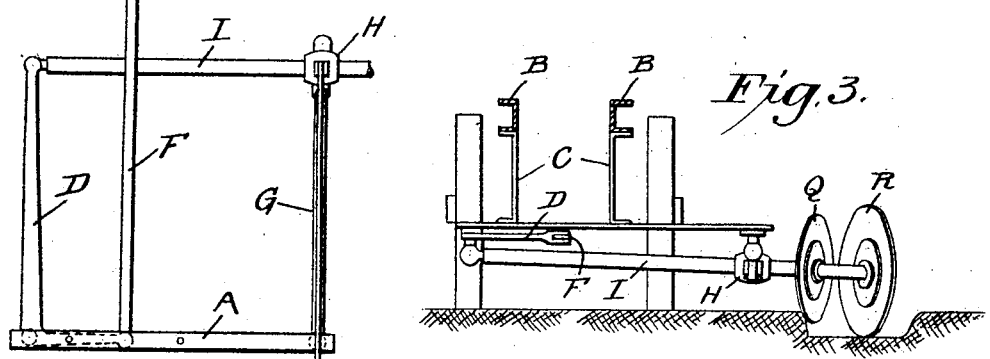
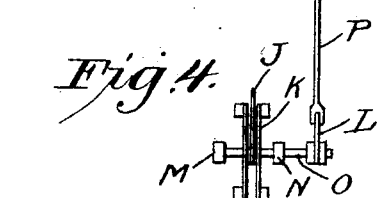
Inventor:
Arthur J. Edgar.

UNITED STATES PATENT OFFICE.

ARTHUR JAMES EDGAR, OF HUMBOLDT, ILLINOIS.

TRACTOR-GUIDE.

1,376,412.     Specification of Letters Patent.     Patented May 3, 1921.

Application filed October 14, 1920. Serial No. 416,856.

*To all whom it may concern:*

Be it known that I, ARTHUR JAMES EDGAR, a citizen of the United States, residing at Humboldt, in the county of Coles and State of Illinois, have invented a new and useful Tractor-Guide, of which the following is a specification.

My invention relates to improvements in tractor guides in which a pair of guide wheels, or disks, mounted on an arm, and connected by a system of levers to the spindles of the front wheels of a tractor automatically guide the tractor parallel to a plowed furrow; and the objects of my improvement are, first, to provide a tractor guide that will not project forward of the tractor front wheels or back of the rear wheels, as either of which arrangements would add part of the length of the tractor guide to that of the tractor, making a short turn of the tractor impossible, and prevent its near approach to a fence before making a turn; second, to suspend the weight of the tractor guide parts to the tractor frame, instead of carrying the load on tractor front spindle, which makes the steering of the tractor by its steering wheel difficult; and, third, to provide a guiding mechanism that is sensitive and will closely follow a furrow.

I attain these objects by the mechanism illustrated in the accompanying drawing, in which—

Figure 1 is a plan view of a tractor with tractor guide attached; Fig. 2, a side elevation of same parts; Fig. 3, a sectional elevation looking forward from line 3—3 of Fig. 1; and Fig. 4, a plan view of guide-wheel arm, rods, levers, sector and necessary connections for attachment to a tractor.

The bar A, Fig. 1, is attached to tractor frame B a little forward of tractor rear wheels, by the hangers C, as shown in Figs. 2 and 3, and serves also as a fulcrum for the lever D and the rod G. Bar A receives the thrust transmitted from arm I through push rod G, and the pull transmitted from arm I through the forward arm of lever D, due to the resistance of the forward movement of the guide wheels Q and R in the furrow. The rear inner end of lever D is connected with the rear end of rod F, the forward end of which connects with the inner end of lever E, which is keyed to the left spindle yoke at front of tractor.

The guiding of the tractor parallel to and always at a fixed distance from the furrow is accomplished in the following way: The plane of the guide wheel, or disk R, which revolves on the right hand end of arm I, and travels in a furrow, is directed forward and inward, which has a tendency to push arm I inward, and hold the inner guide wheel, or inner disk Q, firmly against the vertical wall of the furrow. When the furrow deflects toward the left the wheel R pushes the arm I to the left, carrying the forward end of lever D to the left, and moving the inner rear end of lever D forward, transmitting the forward motion through rod F to the inner end of lever E, which swings tractor wheels to the left, in the same direction the furrow deflects. When the furrow deflects to the right, guide wheel Q, against the vertical wall of the furrow, which it hugs, pulls arm I to the right, carrying the forward end of lever D to the right, the inner rear end of lever D, connecting with the rear end of rod F, moves backward, the forward end of rod F, pulls lever E backward and the tractor front wheels are turned to the right, in the same direction the furrow deflects.

The attachment of guide-wheel arm I to lever D, and the attachment of push rod G to bar A are universal joints, to permit arm I to swing across the tractor frame in a horizontal plane, and the right hand end of arm I to be swung up in a vertical plane, lifting guide wheels Q and R from the ground, when tractor is traveling on a road or whenever there is no furrow to follow. The guide wheels may be elevated by the lever J, in the sector K, swinging on shaft O, in bearings M and N, mounted on fender over tractor rear right wheel. On outer end of shaft O the crank arm L is secured, which arm is connected to the sleeve H on guide-wheel arm I by the rod P. The lever J may be held from moving too far forward by inserting a pin V, in the hole U in the sector K, or the guide wheels may be hooked up by inserting a pin in the hole T in the sector K.

I am aware that prior to my invention tractor guides have been made and operated, guiding a tractor by means of one or more guide wheels traveling in a furrow, and connected to a front spindle of the tractor. I therefore do not claim such a combination broadly, but I claim:

1. A guide for tractors comprising a bar adapted to be rigidly secured to the tractor, an L-shaped lever pivoted to said bar, an arm universally connected to one end of said lever, furrow guiding means carried by the other end of the arm, a push-rod universally connected to the bar and attached to the arm, and means connecting the other end of the lever and the tractor front wheels.

2. A guide for tractors comprising a bar provided with hangers adapted to be secured to the frame of the tractor, an L-shaped lever pivoted to said bar near one end, an arm universally connected to one end of the lever, furrow guiding disks mounted on the other end of said arm, a push rod universally connected to the bar remote from the lever and attached to the arm, a rod pivotally connected to the other end of the lever, means connecting said rod and one end of the front tractor wheel spindles, and means to raise the arm to inoperative position.

3. A tractor guide comprising a bar rigidly secured to the under frame of the tractor in front of the rear wheels, an L-shaped lever pivoted to said bar, an arm universally connected to one end of said lever, furrow guiding disks mounted on the other end of said arm, a push rod universally connected to the bar and attached to the arm, a lever keyed to one of the front wheel spindles, a rod pivotally connected to the other end of the L-shaped lever and to the wheel spindle lever, a lifting rod connected to the arm and means convenient to the operator for securing the lifting rod in various positions.

ARTHUR JAMES EDGAR.